(No Model.)
W. W. & J. H. GRAHAM.
FODDER BINDER.
No. 542,363. Patented July 9, 1895.
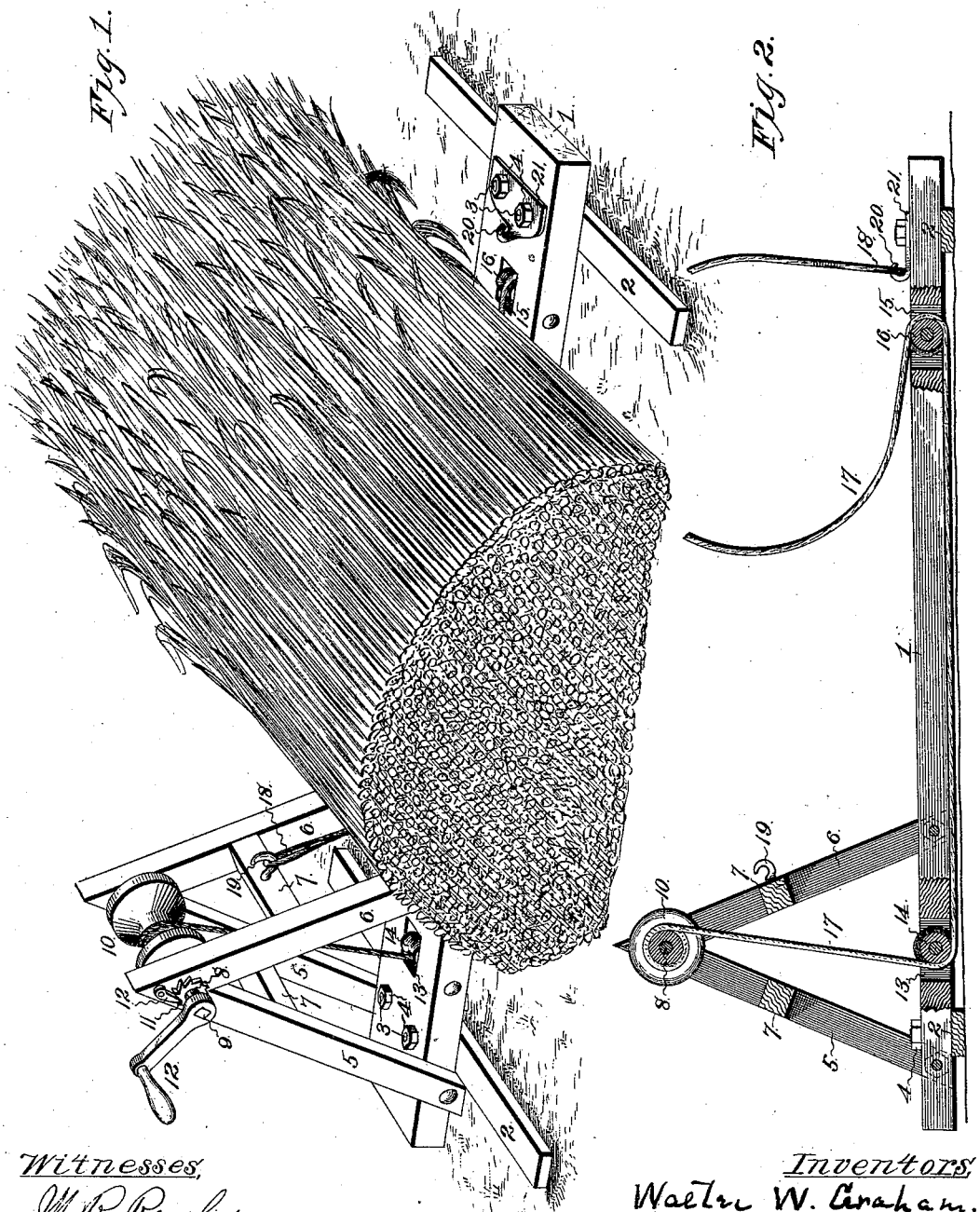
Witnesses
M. R. Remley
[signature]
Inventors
Walter W. Graham
James H. Graham
By [signature]
attys

UNITED STATES PATENT OFFICE.

WALTER W. GRAHAM AND JAMES H. GRAHAM, OF MAYVIEW, MISSOURI.

FODDER-BINDER.

SPECIFICATION forming part of Letters Patent No. 542,363, dated July 9, 1895.

Application filed January 24, 1895. Serial No. 536,008. (No model.)

*To all whom it may concern:*

Be it known that we, WALTER W. GRAHAM and JAMES H. GRAHAM, of Mayview, Lafayette county, Missouri, have invented certain new and useful Improvements in Fodder-Binders, of which the following is a full, clear, and exact description, reference being had to the accompanying drawings, forming a part hereof.

Our invention relates to fodder-binders, and has for its object to provide a device whereby stalks, after being stripped of corn, may be easily and quickly secured together in bundles by one man.

A further object is to produce a device of this character which is simple, strong, durable, and inexpensive of construction and conveniently portable.

With these objects in view the invention consists in certain novel and peculiar features of construction and combinations of parts, as will be hereinafter described and claimed.

In order that the invention may be fully understood, we will proceed to describe it with reference to the accompanying drawings, in which—

Figure 1 represents in perspective a fodder-binder embodying our invention, and also illustrates the mode of arranging the fodder thereon before it is bound. Fig. 2 represents a vertical longitudinal section of the device.

In the said drawings, 1 designates a base or bridge-beam, upon which the fodder is placed when it is to be bound, and said base or bridge-beam is supported near its opposite ends upon the transverse bars 2, which rest upon the ground and are securely connected to said beam 1 by bolts 3 and nuts 4, as shown. Bolted, as shown, or otherwise rigidly secured to said beam at opposite sides, are the inclined standards 5 5, and opposing said standards and converging upwardly therewith are a similar pair of standards 6 6, which are also secured to said beam at opposite sides. These converging standards 5 and 6 may be secured together in any suitable manner at their upper ends and each pair of parallel standards 5 5 and 6 6 are connected together and braced apart by the cross-bars 7, or may be secured in their proper relative positions in any other suitable or preferred manner. Arranged transversely of the beam 1 and journaled near its opposite ends in the upper ends of the standards 5 and 6 is a shaft 8, one end of which is preferably squared, as shown at 9. A drum 10 is mounted rigidly upon said shaft between the pairs of converging standards and the ratchet-wheel 11, also mounted rigidly upon said shaft, is engaged by a gravity-pawl 12, carried by the contiguous pair of standards 5 6. Vertically below the drum 10 the beam 1 is provided with a vertical aperture 13, in which is located a grooved roller 14, which is mounted rotatably upon a bolt or pin, as shown, or in any other suitable manner. Near its front end said beam is provided with a similar aperture 15, in which is rotatably mounted a roller 16 in the manner described with reference to the roller 14. A cable or rope 17 is secured at one end to the drum 10, and thence extends downward and engages the guide-roller 14. From said roller it extends forwardly beneath the beam 1, and engages the roller 16, and when the device is not in use the loop or eye 18 at the front end of the said cable or rope is detachably engaged with the hook 19, carried by the front cross-bar 7, or in any other suitable manner.

In operation the fodder, or any other material to be bound, is arranged transversely of and upon the beam 1 lying between the standards 6 and the guide-roller 16, and also upon that portion of the cable or rope extending from said roller to the hook 19. Immediately the fodder or grain is properly positioned the loop or eye 18 is disengaged with the hook 19, and is brought forwardly over the said fodder or grain and is engaged by the hook 20, arranged, preferably, forward of the guide-roller 16 and projecting upwardly from a plate 21, which is secured upon the bottom by the same bolts and nuts which secure the said bottom and the front cross-bar 2 together. The said loop being properly engaged with the hook 20 a crank-handle 22, if not already in position, is slipped upon the squared end of the shaft 8, and is operated to wind the cable or rope upon the drum, and therefore diminish the length of the rope or cable beyond the guide-roller 16 and compress the fodder or grain into a small and compact bundle, which at the point of engagement with the rope or cable is approximately circular, as shown by the position of the rope in Fig. 2. Immediately the fodder or grain is compressed into a bundle sufficiently small and the operator ceases to turn the shaft 8, the gravity-pawl 12 engaging the ratchet-wheel 11 prevents the back rotation of the same and holds the bundle in the position described. The operator now passes wire or cord or any other suitable binding material tightly around the bundle and secures the ends of the same securely together, thereby completing the formation of the bundle, which may be cast aside after the loop or eye of the rope or cable is disconnected from the hook 20 and is re-engaged with the hook 19. The device is now in position to repeat the operation described.

While we have described and shown a particular kind of supporting-framework for the shaft and its component mechanism, it is to be understood that any suitable framework possessing the required strength may be employed in lieu thereof, and that means other than the crank-handle 22 may be employed for rotating the drum. It will also be understood that various other changes in detail construction may be made without departing from the spirit and scope of our invention.

Having thus described our invention, what we claim as new, and desire to secure by Letters Patent, is—

A fodder-binder, comprising transverse bars, a base or bridge-beam secured thereto, a framework secured near one end of and projecting above said base or bridge-beam, a shaft journaled therein, a drum mounted upon said shaft, a ratchet-wheel also mounted upon said shaft, a pawl carried by said framework and engaging said ratchet-wheel, a hook carried by said framework, a hook carried near the front end of the base or bridge-beam, guide-rollers carried by said bridge-beam, one contiguous to said framework, and the other to the hook carried by said base or bridge-beam, a cable or rope engaging said guide-rollers, and provided with an eye or loop at one end and secured to the said drum at its opposite end, and means to operate said shaft, substantially as set forth.

In testimony whereof we affix our signatures in the presence of two witnesses.

WALTER W. GRAHAM.
JAMES H. GRAHAM.

Witnesses:
 THOS. A. WALKER,
 C. W. SEEBER.